July 11, 1939.    C. C. FARMER    2,166,001
FLUID PRESSURE BRAKE
Filed May 24, 1938
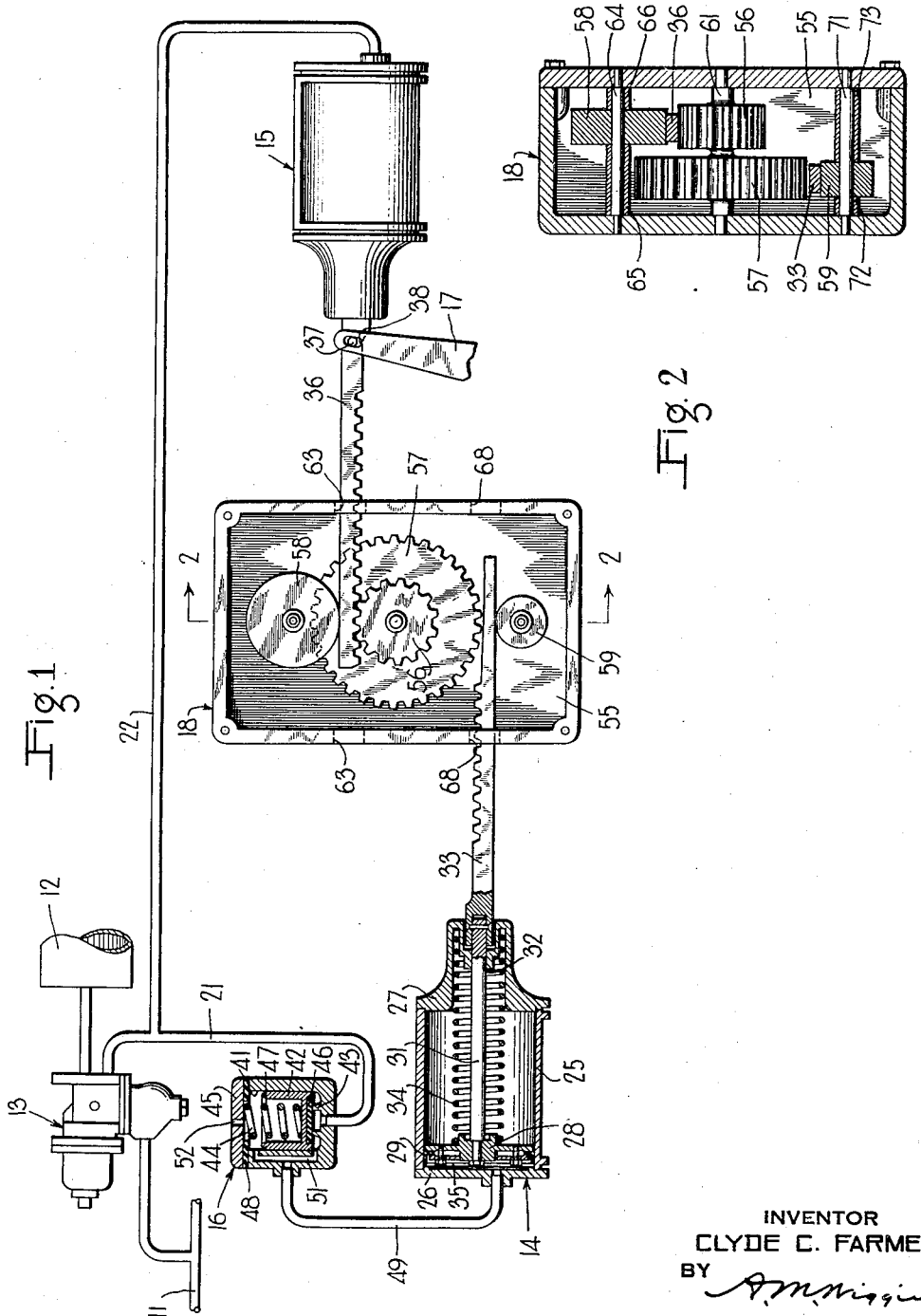
INVENTOR
CLYDE C. FARMER
BY
ATTORNEY Patented July 11, 1939

2,166,001

UNITED STATES PATENT OFFICE 2,166,001

FLUID PRESSURE BRAKE

Clyde C. Farmer, Pittsburgh, Pa., assignor to The Westinghouse Air Brake Company, Wilmerding, Pa., a corporation of Pennsylvania Application May 24, 1938, Serial No. 209,646

5 Claims. (Cl. 303—6)

This invention relates to fluid pressure brakes for vehicles such as railway cars and trains, and particularly to fluid pressure brake equipment having a plurality of brake cylinders functioning cooperatively to effect application of the brakes.

In my copending application Serial No. 203,581 filed April 22, 1938, there is disclosed a fluid pressure brake equipment for railway cars and particularly for modern steam locomotives in which the space available for mounting brake cylinders is limited. The equipment shown includes a so-called slack take-up brake cylinder and a main brake cylinder, the push rods associated with the pistons of the two brake cylinders being connected to gear rack elements operatively associated respectively with two different gear wheels adapted to be connected for rotation together by a fluid pressure controlled clutch mechanism.

My present invention is an arrangement for simplifying the equipment shown in my above-mentioned copending application while at the same time effecting the same general result and possessing the same advantage as the brake equipment of that application.

In general therefore, it is an object of my invention to provide a novel arrangement for coordinating the operation of a slack take-up brake cylinder and a main brake cylinder.

Another object of my invention is to provide a brake equipment including a slack take-up and a main brake cylinder and a novel arrangement for coordinating the operation of the slack take-up and main brake cylinders through a power amplifying gear mechanism.

The above objects and other objects of my invention which will be made apparent hereinafter are attained by means of a brake equipment subsequently to be described and shown in the accompanying drawing, wherein Fig. 1 is a simplified diagrammatic view with certain parts in section, illustrating one embodiment of my invention, and Fig. 2 is a sectional view, taken on the line 2—2, of Fig. 1.

Description of equipment

Referring to Fig. 1, the essential parts of the equipment shown are a brake pipe 11, an auxiliary reservoir 12, a brake controlling valve device 13, illustrated as the familiar triple valve, a main brake cylinder 14, a slack take-up brake cylinder 15, an application valve 16 for controlling the supply of fluid under pressure to and the release of fluid under pressure from main brake cylinder 14, a brake operating lever 17, and a gear mechanism 18 for associating the brake cylinders 14 and 15 in a manner to be presently described.

The brake pipe 11 is normally charged with fluid under pressure in well known manner under the control of a brake valve device, not shown, and the triple valve 13 is operated in response to the normal pressure established in the brake pipe 11 to effect charging of the auxiliary reservoir 12 to the pressure established in the brake pipe 11 and at the same time to connect to atmosphere a pipe 21 leading to the application valve 16 and having a branch 22 leading to the slack take-up brake cylinder. Upon a reduction of the pressure in the brake pipe 11 at either a service or an emergency rate by means of the brake valve not shown, the triple valve 13 is correspondingly operated to supply fluid under pressure from auxiliary reservoir 12 into the brake cylinder pipe 21 and slack take-up brake cylinder 15 through the branch pipe 22, in well known manner, to effect either a service or an emergency application of the brakes.

The brake cylinders 14 and 15 are of any suitable construction and for simplicity are shown to be of identical construction so that description of only one thereof is deemed necessary. It is to be noted, however, that while the brake cylinders 14 and 15 may be of conventional construction they are not of conventional size, being much smaller in diameter and length than conventional brake cylinders for reasons which will be hereinafter made apparent.

Brake cylinder 14 may comprise the usual cylindrical casing 25 having secured thereto, in any suitable manner, a pressure head or end cover 26 and a non-pressure head or end cover 27. Reciprocative in the cylinder 25 is a piston 28 provided with a suitable sealing ring or gasket 29 and having attached thereto a suitable stem or rod 31 which projects slidably through a journal opening 32 formed in the non-pressure head 27. Suitably attached to the exterior end of the piston stem 31 is a gear rack 33 which will be described in greater detail later. Interposed between piston 28 and the non-pressure head 27 is a release or return spring 34 which is effective to shift the piston 28 into the left-hand or release position shown when fluid under pressure is released from the piston chamber 35 formed between the piston and pressure head 26.

The slack take-up brake cylinder 15 is similar in construction to the main brake cylinder 14 and, accordingly, identical parts in the two brake cylinders are designated by the same reference numerals. The piston stem 31 of the brake cylinder 15 has connected to the exterior end thereof a gear rack element 36 which differs somewhat from the gear rack element 33 as will be presently pointed out.

The brake operating lever 17 is pivoted to the gear rack element 36 as by a pin 37 fixed on the gear rack element and engaging in a suitable slot 38 in the lever 17. The brake operating lever 17 is pivoted at a point removed from the pin 37 in a manner not shown and, accordingly, the slot 38 enables the gear rack element 36 to move in a straight line notwithstanding the movement of the end of the lever 17 associated with the gear rack element through an arc. The brake operating lever 17 may be effective to operate the brake shoes associated with a vehicle wheel in any suitable manner.

The application valve 16 comprises a casing having a bore 41 therein containing a valve piston 42 that is yieldingly urged downwardly into seated relation on an annular rib seat 43 by a coil spring 44 interposed between the back side of the valve piston 42 and the end cover 45 of the casing. The face of the valve piston 42 is provided with a gasket 46 of suitable material for engaging the annular rib seat 43 in sealing relation and the rear edge of the valve piston is provided with an annular rib 47 for engaging in sealing relation an annular gasket 48 secured in position by the end cover 45 of the casing.

The piston chamber 35 of the main brake cylinder 14 is connected by a pipe 49 to a passage 51 in the casing of the application valve 16 which opens at the lower end thereof into the space at outer seated area of the valve piston 42 when seated on the annular rib seat 43 and, at the upper end thereof, into the bore 41 at the back of the valve piston. The end cover 45 of the casing is provided with an exhaust port 52 so that the back of the valve piston 42 is constantly subject to atmospheric pressure.

The pipe 21 opens at the inner seated area of the valve piston 42 within the annular rib seat 43. The tension of the spring 44 is such as to hold the valve piston 42 seated on the annular rib seat 43 against the pressure of the fluid supplied into the pipe 21, under the control of the triple valve 13, until a certain uniform pressure is attained such as five pounds per square inch at which the slack in the brake rigging has been taken up by the slack take-up brake cylinder 15 and the brake shoes are contacting the braking surface or rim of the car wheel or wheels. Instantly upon the unseating of the valve piston 42 from the annular rib seat 43 due to the pressure of the fluid in the pipe 21, the entire face of the valve piston 42 is subject to the fluid pressure. The resulting sudden increase in force snaps the valve piston 42 upwardly against the yielding resisting force of spring 44 to effect seating of the annular rib 47 of the valve piston 42 on the annular gasket 48. The communication from the piston chamber 35 of brake cylinder 14 to atmosphere through the exhaust port 52 is thus cut off by the valve piston 42 in its upper position and, at the same time, fluid under pressure is supplied from the pipe 21 through the pipe 49 to the piston chamber 35 to exert a force on the brake cylinder piston 28.

Conversely, upon sufficient reduction of the pressure in the pipe 21 under the control of the triple valve 13, the valve piston 42 is reseated by the spring 44 to cut off the supply communication from the pipe 21 to the piston chamber 35 of brake cylinder 14 and reestablish the exhaust communication from the piston chamber 35 through pipe 49 and atmospheric exhaust port 52 in the application valve 16.

The gear mechanism 18 comprises according to my invention, a suitable casing providing a chamber 55 containing two gear wheels 56 and 57 and two guide rollers 58 and 59.

The gear wheels 56 and 57 are keyed or otherwise suitably fixed to a shaft 61 suitably journaled at opposite ends thereof in the spaced front and rear walls of the casing.

The gear wheels 56 and 57 are of different diameters and the ratio between their diameters may be any desired value, the gear wheel 56 being the smaller of the two gear wheels.

The gear rack element 36 connected to the piston stem 31 of the slack take-up brake cylinder 15 extends through one of two aligned openings 63 in the opposite end walls of the casing of the gear mechanism 18 and meshes with the smaller gear wheel 56. The guide roller 58 is rotatably mounted on a shaft or rod 64 supported at opposite ends by the front and rear walls of the casing of the gear mechanism 18, suitable spacer sleeve elements 65 and 66 being provided on the shaft 64 on opposite sides of the roller 58 to maintain it in the plane of the gear wheel 56. The edge of the gear rack element 36 opposite to the teeth on the gear rack element is a smooth surface and the roller 58 engages the smooth surface to maintain the rack in constant meshing relation with the gear wheel 56.

The second opening 63 in the opposite end wall of the casing is provided to enable the gear rack 36 to project through the end wall when the piston of the slack take-up brake cylinder 15 shifts the rack in the left-hand direction out of its normal release position.

The end walls of the casing of the gear mechanism 18 are also provided with suitable aligned openings 68 and the gear rack element 33 of the main brake cylinder 14 extends through the opening 68 in one of the end walls into the chamber 55 of the casing. The other opening 68 enables the rack 33 to project through the opposite end wall of the casing when the rack is shifted in the right-hand direction. The gear rack 33 is provided with gear teeth for meshing with the gear wheel 57 but the teeth on the gear rack terminate short of the outer end of the rack and the portion of the rack between the teeth and the end of the rack is formed or cut away at least to the base of the teeth on the gear rack so that the gear wheel 57 may rotate without engaging the teeth of the gear rack unless the rack is shifted in the right-hand direction.

The guide roller 59 serves to support the gear rack 33 and to prevent separation of the teeth on the rack 33 from the teeth on the gear wheel 57 when the rack and gear wheel are in meshed relation. As shown in Fig. 2, the roller 59 is rotatably supported on a rod or shaft 71 which is supported at opposite ends in the front and rear walls of the casing and maintained in alignment with the gear wheel 57 by suitable spacer sleeves 72 and 73 on opposite sides respectively of the roller 59.

*Operation*

Let it be assumed that the brake pipe 11 and the auxiliary reservoir 12 are charged to the normal pressure carried therein in the usual manner and that it is desired to effect an application of the brakes on the car. In such case, the operator may effect a service reduction of the pressure of the brake pipe 11. The triple valve 13 operatively responds to such reduction in brake pipe pressure to cause fluid under pressure to be supplied from the auxiliary reservoir 12 through pipes 21 and 22 to the application valve 16 and slack take-up brake cylinder 15. The valve piston 42 of the application valve 16 remains seated for a time, as previously pointed out, and thus fluid under pressure is supplied initially only to the piston chamber of slack take-up cylinder piston 15. The pressure of fluid supplied to the piston chamber of the slack take-up brake cylinder 15 shifts the piston 28 thereof in the left-hand direction and thus the gear rack 36 is shifted in the left-hand direction to cause movement of the brake lever 17 to move the brake shoes into contact with the braking surface of the vehicle or car wheels. It will be observed that the movement of the gear rack 36 causes rotation of the gear wheels 56 and 57 without interference with the gear rack 33 of the main brake cylinder 14.

Substantially at the time the brake shoes contact the braking surface on the car wheels, the application valve 16 operates to supply fluid under pressure from the pipe 21 to the pipe 49 and the connected piston chamber 35 of the main brake cylinder 14. The pressure of the fluid acting on the piston 28 of the brake cylinder 14 accordingly shifts the gear rack 33 in the right hand direction until the teeth on the rack 33 mesh with the teeth on the gear wheel 57. Thereafter the fluid pressure force acting on the piston 28 of the brake cylinder 14 and the fluid pressure force acting on piston 28 of slack take-up brake cylinder 15 act in unison to shift gear rack 36 and thus exert a force on the brake lever 17 to apply the brake shoes to the braking surface of the associated car wheel or wheels.

Due to the ratio in the diameter of the gear wheels 56 and 57, the fluid pressure force exerted on gear rack 36 by the piston 28 of the main brake cylinder 14 is correspondingly amplified. It will thus be seen that the piston 28 of the main brake cylinder 14 may be smaller than the area of the piston of a conventional brake cylinder without sacrificing or diminishing the effective braking force exerted thereby. Furthermore, the slack take-up brake cylinder 15 is effective to take up the slack in the brake rigging and thus the actual travel of the piston 28 of the main brake cylinder 14 may be made relatively short, so that the main brake cylinder 14 may therefore be of relatively short length because the movement of the brake lever 17, after the brake shoes engage the braking surface of the vehicle wheels is small.

The slack take-up brake cylinder 15 is much smaller in diameter than the conventional brake cylinder since the force exerted thereby need be sufficiently only to take up the slack of the brake rigging.

The space usually available on modern locomotives will permit mounting of two brake cylinders of relatively small diameter, but is insufficient for one brake cylinder of relatively large diameter. Thus the brake cylinders 14 and 15, which are both of relatively small diameter, and the gear mechanism 18 may be suitably arranged in the limited space available, particularly on a modern locomotive, to provide adequate braking power.

Obviously, the operator may so control brake pipe pressure in the usual manner as to effect a graduated application, a service application in any desired degree, or an emergency application of the brakes.

In order to effect release of the brakes, the operator restores the pressure in the brake pipe 11 to its normal pressure. The triple valve 13 accordingly operates in the usual manner to recharge auxiliary reservoir 12 and vent fluid under pressure from the piston chambers of the two brake cylinders 14 and 15 through the pipes 21 and 22. Upon the reduction in the pressure in piston chambers of the brake cylinders 14 and 15, the release spring 34 therein returns the respective pistons 28 of the brake cylinders toward the normal release position, thus relieving the force exerted by the brake lever 17 in applying the brakes.

When the pressure in the piston chamber 35 of the main brake cylinder 14 decreases to a point below the fluid pressure force necessary to unseat the valve piston 42 against the force of the spring 44, the valve piston 42 is shifted downwardly to seated relation on the annular rib seat 43 to cut off the connection between the pipe 21 and the pipe 49 and reestablish the exhaust communication from the pipe 49 to atmosphere through the exhaust port 52. Fluid under pressure is thus completely released from the piston chamber 35 of brake cylinder 14 and the gear rack 33 is accordingly returned in the left-hand direction to its normal position shown, in which the teeth on the gear rack disengage the teeth on the gear wheel 57.

When the pressure in the piston chamber of the slack take-up brake cylinder 15 is reduced, the force of the release spring of the brake cylinder 15 returns gear rack 33 to its normal release position and thus, through the brake lever 17, disengages the brake shoes from the braking surfaces of the associated car wheels and accordingly effects the complete release of the brakes.

*Summary*

It will accordingly be seen that I have provided brake equipment for a railway locomotive, a car or other vehicle, including a slack take-up brake cylinder and a main brake cylinder associated through a gear wheel mechanism in such manner as to amplify the braking force exerted by the main brake cylinder. It will be further apparent that I have provided a novel arrangement for preventing the application of braking force to a braking lever by the main brake cylinder until the pressure of fluid supplied to the slack take-up brake cylinder exceeds a certain uniform pressure.

While I have disclosed only one embodiment of my invention, it will be apparent that various omissions, additions or modifications may be made in such embodiment without departing from the spirit of my invention. It is accordingly not my intention to limit the scope of my invention except as it is necessitated by the scope of the prior art.

Having now described my invention, what I claim as new and desire to secure by Letters Patent, is:

1. A fluid pressure brake equipment comprising a brake operating lever, a gear wheel effective upon rotation to cause movement of the brake lever to apply the brakes, a brake cylinder containing a piston having a stem, and a gear rack moved by said piston stem, said gear rack having teeth thereon normally out of mesh relation with said gear wheel and moved into meshing relation with said gear wheel only after the gear rack is shifted at least a certain distance out of its normal position.

2. A fluid pressure brake equipment comprising a brake operating lever, a gear wheel effective upon rotation to cause movement of the brake operating lever to apply the brakes, a brake cylinder containing a piston having a stem, and a gear rack moved by said stem in a straight line, said gear rack having teeth thereon so disposed that the gear rack and gear wheel are normally out of meshing relation with each other and moved into meshing relation with each other only after said gear rack element is shifted at least a certain distance out of its normal position in a brake application direction.

3. A vehicle brake equipment comprising a brake operating lever, a first brake cylinder so arranged as to be constantly effective to exert a force on the brake lever to apply the brakes, a gear wheel so arranged that when rotated in a given direction it exerts a braking force on said lever, a second brake cylinder, and a gear rack operated by the said second brake cylinder and having teeth thereon adapted to engage said gear wheel in meshing relation to rotate said gear wheel in the said given direction only after the gear rack has moved a certain amount out of its normal position in a brake application direction.

4. A vehicle brake equipment comprising a brake operating lever, a first brake cylinder operable at all times to exert a brake applying force on the said brake lever, a second brake cylinder having a piston, a gear rack adapted to be moved by said piston, a gear wheel adapted to mesh with said gear rack and to be rotated by movement of the gear rack to exert a brake applying force on said brake lever, said gear rack being so arranged with respect to said gear wheel that the teeth on the gear rack do not mesh with said gear wheel until after the gear rack has shifted at least a certain distance out of its normal position in the brake application direction.

5. A vehicle brake equipment comprising a brake operating lever, a first brake cylinder operable at all times to exert a brake applying force on the said brake lever, a first gear rack connected to said lever, a second brake cylinder, a second gear rack operated by said second brake cylinder, two gear wheels adapted to rotate together, one of said gear wheels cooperatively meshing with said first gear rack and the other of said gear wheels being adapted to cooperatively mesh with said second gear rack, said second gear rack having teeth thereon so disposed as to be normally out of mesh relation with said other gear wheel and adapted to cooperatively mesh with the said other gear wheel to cause a braking force to be exerted on the brake lever only after said second gear rack is shifted at least a certain amount out of its normal position in a brake application direction.

CLYDE C. FARMER.